May 23, 1939.  J. S. LYNCH  2,159,561
METHOD OF AND APPARATUS FOR REMOVING SCALE FROM AND SIZING RODS AND THE LIKE
Filed Jan. 16, 1935  4 Sheets-Sheet 3

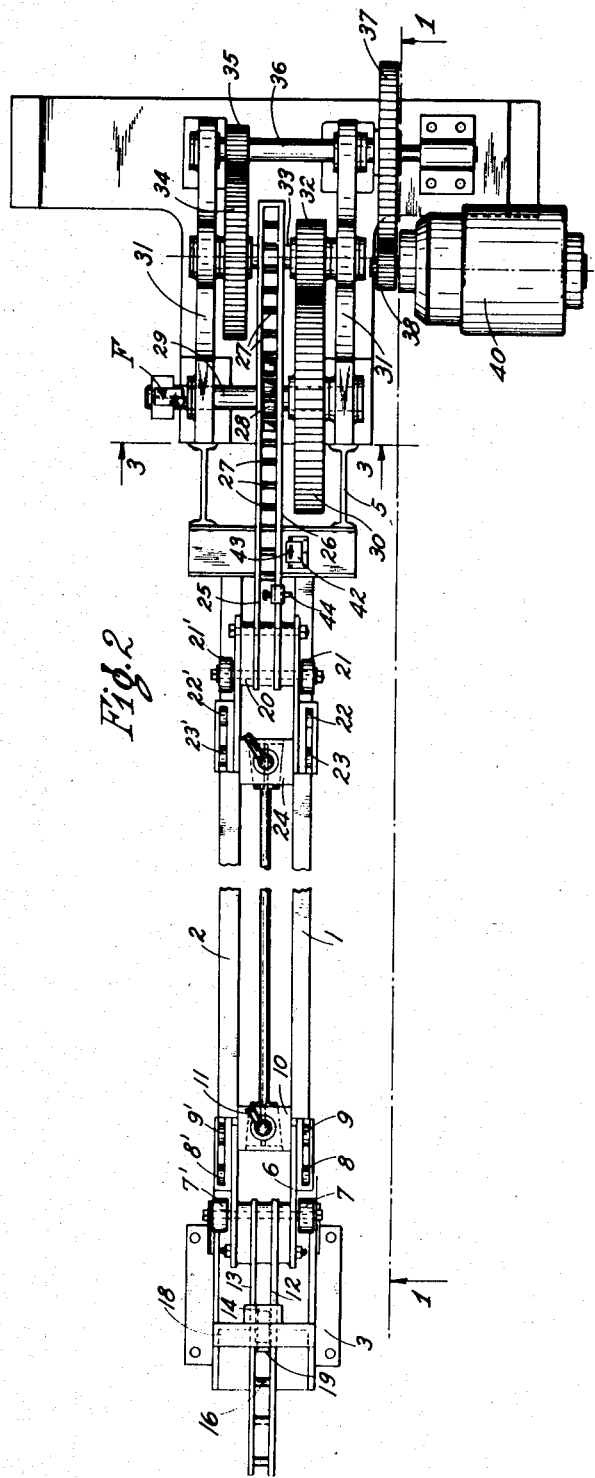

Inventor
JOHN S. LYNCH
BY
Richey Watts
Attorneys

May 23, 1939.  J. S. LYNCH  2,159,561
METHOD OF AND APPARATUS FOR REMOVING SCALE FROM AND SIZING RODS AND THE LIKE
Filed Jan. 16, 1935   4 Sheets-Sheet 4
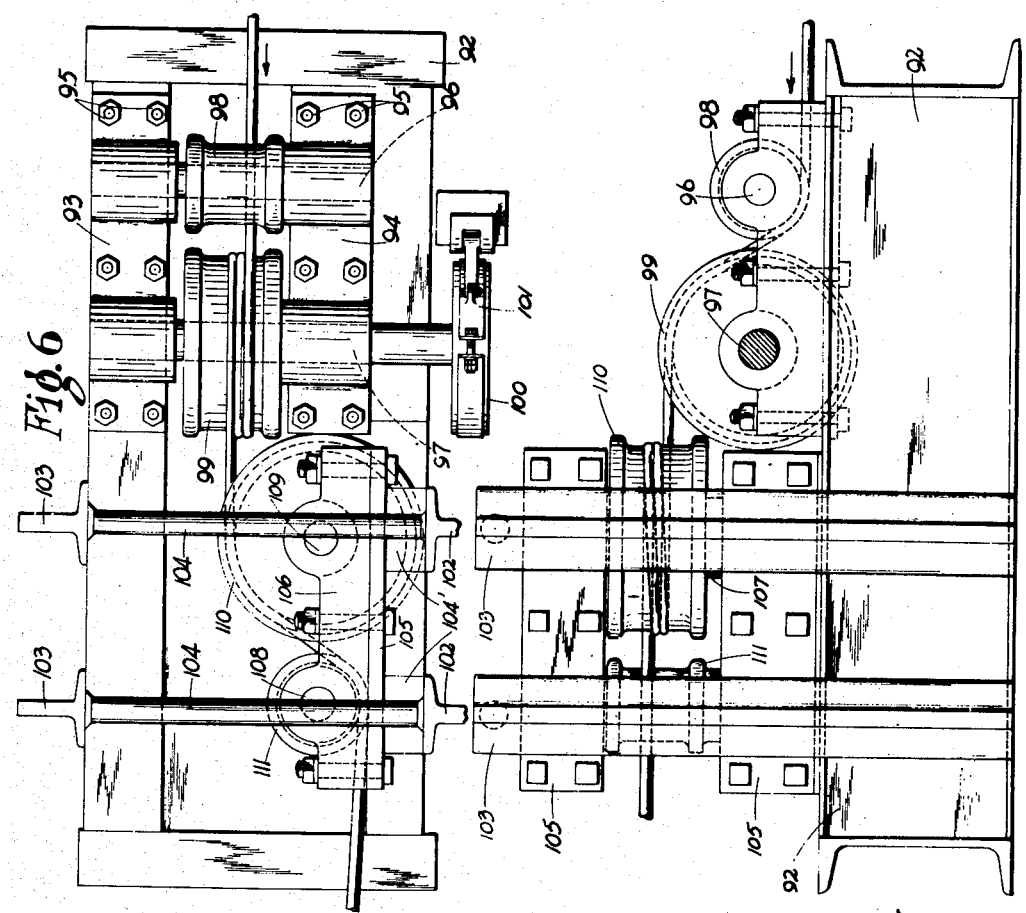
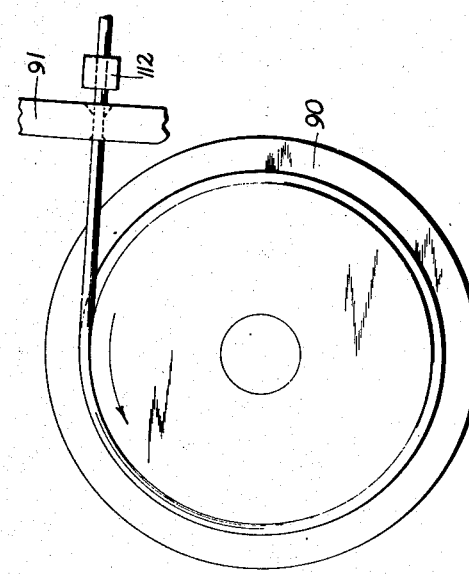
Inventor
JOHN S. LYNCH
Richey & Watts
Attorney Patented May 23, 1939

2,159,561

UNITED STATES PATENT OFFICE 2,159,561

METHOD OF AND APPARATUS FOR REMOVING SCALE FROM AND SIZING RODS AND THE LIKE

John S. Lynch, Massillon, Ohio, assignor, by mesne assignments, to Republic Steel Corporation, Cleveland, Ohio, a corporation of New Jersey Application January 16, 1935, Serial No. 2,021

12 Claims. (Cl. 205—3)

This invention relates to an improved method of and apparatus for removing scale from metallic articles and particularly for removing scale from hot rolled and/or annealed steel bars, rods, wire and the like and also to an improved method of and apparatus for descaling hot rolled and/or annealed bars, rods and the like and producing a close tolerance finished product with a minimum of waste or scrap loss.

In the ordinary processes of hot rolling steel bars and rods, a rather heavy and very closely adhering scale is formed on the surface of the bars. An even heavier scale is formed on annealed and heat treated rods or bars. Prior to my invention the usual method of removing this scale consisted of pickling the articles in a suitable acid solution, (for example, a 4% solution of sulphuric acid). This process necessitated very expensive equipment in the form of pickling vats, acid tanks, non-ferrous pipe and fittings, etc. In pickling annealed and heat treated stock from six to eight hours are required and in pickling the ordinary hot rolled bar or rod between thirty and forty minutes are required for proper removal of the scale. In pickling, great care must be exercised to prevent pitting and similar surface defects on the pickled articles. This pitting may occur with almost any degree of pickling except a mere dipping of the stock in the acid solution. Another inherent disadvantage of the pickling operation is that a certain amount of metal is dissolved away by the acid and completely lost. By the use of my improved scale removing method all pickling will be eliminated except that which may be used to improve the appearance of the product and the time required for scale removal will be reduced to a very small percentage of that previously consumed by the pickling processes. Moreover only the scale is removed and the above noted metal loss, which reaches considerable proportions in large production, is completely avoided. In addition, in my scale removing operation the cross sectional area of the articles may be reduced to the desired value within very close tolerance and without the use of drawing dies or the like. After removing the scale by my process the rod may be drawn through a die without any pickling and, if desired, the de-scaling and drawing operations may be carried on continuously.

In order to remove the scale by my improved process I propose to stretch the bar or other article being treated, preferably by applying a tensile stress at spaced points on the length thereof, to such an extent that the scale and its adherence to the metal is broken. When this degree of elongation is reached the scale will break up and be freed from the metal of the bar.

I have found that by stretching relatively long lengths of bar (for example, 1¾" diameter bar approximately 40 ft. long) a relatively small amount (for example, about 20" or within a range of between say 2% to 6%) the scale will be entirely removed from the bar. It will be understood that different sizes of bar and different types of scale may require different degrees of stretching to obtain the desired de-scaling action. Generally speaking, I have found that stretching the article between 2% and 6% will effectively remove any kind of scale. In this stretching operation the bar, rod or wire can also be accurately sized in its cross sectional dimensions as the cross sectional area of the stretched article is uniformly reduced in proportion to the amount of elongation. In this stretching operation to remove the scale and reduce the cross sectional area to a predetermined smaller area than that of the original article, the concentricity of the article, if the product being treated is of round cross section, is also improved and a "close tolerance" product is produced which needs no further processing except cutting to length in accordance with the customer's requirements. In the old processes of producing the so called "close tolerance" hot rolled bars, the bars were drawn through a die to give them a relatively small reduction in area and bring them to the desired size. My improved stretching step serves, in a single operation, to remove the scale, doing away with the old pickling operation, and to reduce the cross sectional area of the stock the desired amount, thus doing away with the old drawing operation.

If the bars or rods descaled by my method are to be subjected to further drawing, for example, cold drawing into wire, no further treatment will be required. However, in some cases a customer will require a cleaner surface than that which results from merely removing the scale and in such cases this clean surface can be obtained by merely dipping the rod, bar or wire into a 4% sulphuric acid solution and immediately withdrawing it. This dip pickling step cleans the surface of the metal and produces a product which has a brighter finish which in some instancees is desirable. However, it will be understood that this dip pickling is not necessary to effect removal of the scale as this is completely and effectively done in my stretching operation.

Although my improved process can be carried out by various types of apparatus I have developed several particularly simple and efficient devices for carrying out the process. In the accompanying drawings I have illustrated two forms of apparatus particularly adapted to de-scale lengths of bar or rod and another form of apparatus which is adapted to continuously de-scale coils of rod or wire as the rod or wire is passed through the drawing apparatus.

In the accompanying drawings—

Figure 1 is a side elevation of one embodiment of my apparatus adapted to de-scale and size straight lengths of rod or bar.

Figure 2 is a plan view of the apparatus shown in Figure 1.

Figure 6 is a more or less diagrammatic plan view of my improved apparatus for continuously stretching and drawing rods, wire, strip or the like.

Figure 7 is a side elevation of a portion of the apparatus of Figure 6.

Figure 3:
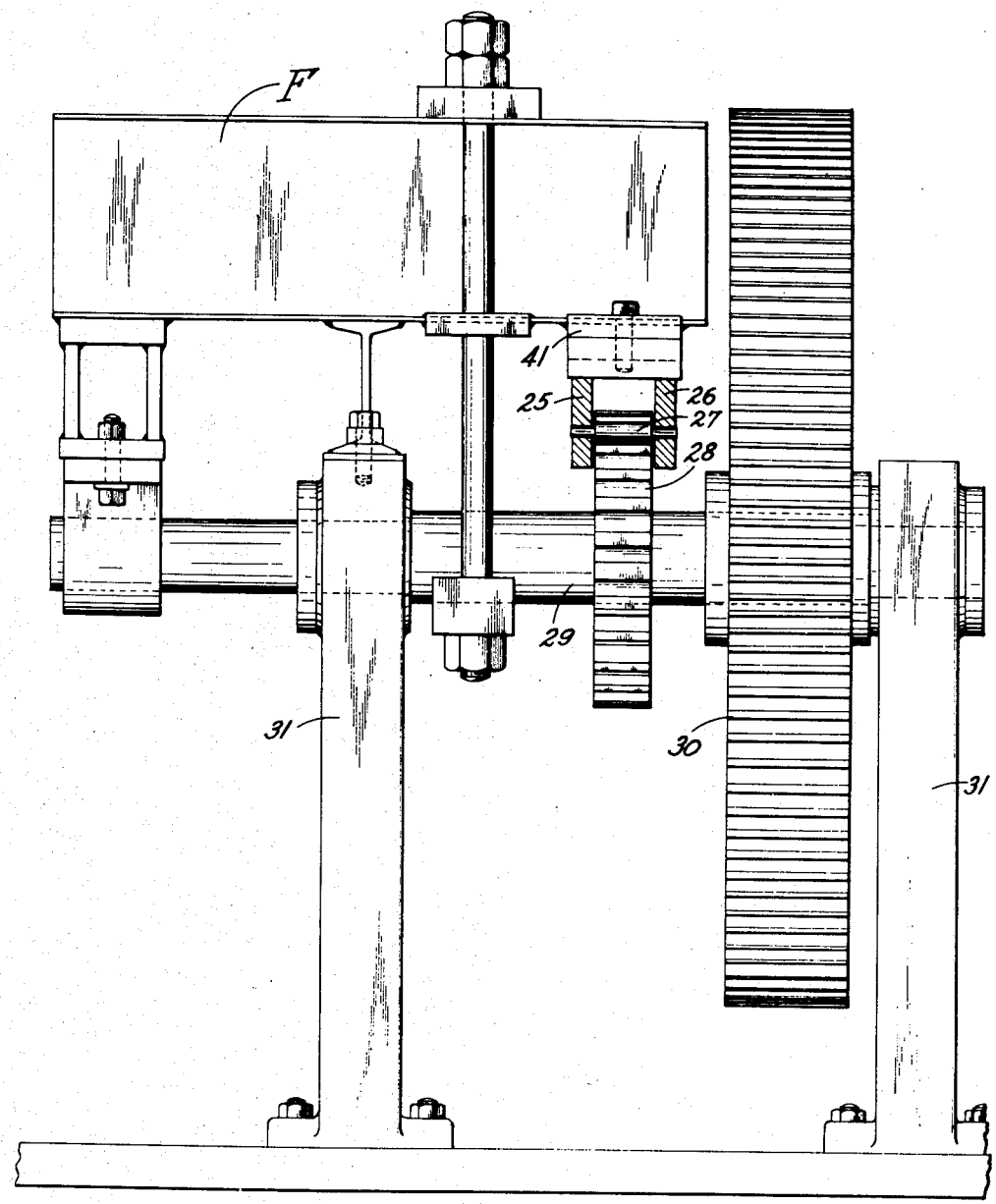
Figure 3 is an enlarged cross section taken on line 3—3 of Figure 2.

Referring now to Figure 1, my de-scaling apparatus consists of the bench B which is built up of the spaced beams 1 and 2 supported at a suitable elevation from the floor by supports 3, 4 and 5. The beams 1 and 2 form a track on which rests the adjustable carriage member C. This carriage C includes a frame portion 6 which supports the wheels 7, 7', 8, 8', 9 and 9'. The wheels 7, 8 and 9 are adapted to run on the member 1 and the wheels 7', 8' and 9' on the member 2. The frame 6 also supports the bar gripping chuck 10. This chuck may be of any suitable form and is preferably of the well known wedge type in which any increased pull on the bar will result merely in an increased gripping action of the chuck jaws. The lever 11 is adapted to be manually operated to release the chuck jaws when it is desired to remove the bar from the machine. Secured to and extending to the left from the frame 6 are a pair of bars 12 and 13 between which are disposed the transverse spacer rods 14, 15 and 16. A roller 17 may be supported from the frame 3 to provide a support for the outer end of the bars 12 and 13. Also supported by the base frame 3 is the bracket 18 through which the members 12 and 13 may extend. A locking pin member 19 may be dropped down between the bars 12 and 13. This locking pin engages the bracket 18 on one side and is engaged by the spacing pin 15 on its other side.

From the above description it will be seen that the carriage C is restrained from movement away from the bracket 18 by the pin 19, the spacing member 15 and the bars 12 and 13. By removing the locking pin 19 the position of the carriage C on the supporting rails 1 and 2 may be adjusted depending on the length of the stock being de-scaled. It will be understood that any desired number of spacing pins, similar to 14, 15 and 16, may be provided in order to give the desired range of positions of the carriage C and the gripping device 10 upon the bench B.

At the opposite end of the rail beams 1 and 2 from the carriage C there is another carriage D. This carriage may be substantially identical to the carriage C and includes a frame member 20, supporting wheels 21, 22, 23, 21', 22' and 23' and a stock gripping device 24. Secured to and extending to the right form the frame 16 there is a pair of spaced bars 25 and 26 which may be generally similar to the bars 12 and 13. These bars are separated by a plurality of pins 27. The pins 27 together with the bars 25 and 26 form a rack which is adapted to engage the teeth of the sprocket 28. The sprocket 28 is carried by the shaft 29 which also carries the large gear 30 and is supported in suitable bearings in the gear frame member 31. The gear 30 engages gear 32 which is carried by the shaft 33, also supported in suitable bearings in the frame 31. The shaft 33 also carries gear 34 which engages gear 35 on shaft 36, also supported in suitable bearings in the frame 31. The shaft 36 also carries gear 37 which engages gear 38 on the shaft 39 of the driving motor 40.

The above described chain of gears suitably reduces the normal operating speed of the motor so that sufficient force will be applied to the rack teeth 27 to move the carriage D to the right and stretch the bar the proper degree and at the proper rate for most effectively removing the scale. In order to overcome the tendency for the rack made up of the members 25, 26 and 27, to jump up when force is applied through the sprocket 28 a hold-down frame F is suitably supported on the base or frame 31 and the shaft 29, as is clearly seen in Figure 3, and is provided with a downwardly extending portion 41 which engages the top of the bars 25 and 26 and restrains them from upward movement relative to the sprocket 28.

In order to control the amount of elongation of the articles being treated I prefer to provide a switch 42 which may be conveniently mounted on the support 5. This switch 42 includes an actuating element 43 which is adapted to be engaged by a dog member 44 which is adjustably mounted on the bar 26. When the switch actuating member 43 is moved to the left the motor 40 will start to rotate in a direction to move the carriage D to the right, in stock stretching direction. This movement will continue until the dog 44 strikes the member 43 moving it to the right to a position where the current is shut off from the motor 40. By adjusting the position of the dog 44 on the bar 26 the amount of stretch imparted to the bar can be controlled. A third position of the switch 43 may be provided to the right of the off position, in which the motor 40 will be reversed to return the carriage D to its original position.

It will be understood that the above described mechanism for controlling the operation of the motor may be varied without departing from the spirit of my invention and it is intended that the switch and dog arrangement is merely illustrative of one way in which the degree of stretch might be controlled. If desired the control switch may be operated manually by the machine operator instead of in the manner above described.

In the operation of this apparatus, if bars approximately 40 feet long are to be de-scaled by stretching each bar approximately 20", the carriage C will be positioned so that the distance between the gripping member 10 and the gripping member 24 will be a little less than 40 feet when the carriage D is in its left hand position. With the carriages C and D a little less than 40 feet apart the rod will be inserted in the gripping devices 10 and 24. The dog 44 will now be approximately 20" from the switch actuating member 43. The motor will be started by manually moving the switch 43 to the left. This will cause the carriage D to be moved to the right stretching the bar until the dog 44 engages the switch actuating lever 43 and shuts off the motor. During the stretching operation the scale may be observed to crack and disintegrate, some of the scale flying away from the bar a considerable distance and the remainder dropping off or being so completely freed that a mere brushing will result in a scale free surface. I have found that a rate of stretch of about 10 to 20 feet per minute is effective for de-scaling hot rolled and annealed bars of approximately ¾" diameter. It may be, however, that other speeds or rates of stretch will be more effective in certain instances and I do not wish to be limited to any particular rate of stretch. It will further be understood that my method is adaptable for removing the scale from bars, rods or wire of round or other cross section. My method may also be adapted to descaling strip steel and sheets up to a considerable width.

As has been noted above, a rod or bar which is processed as above described is in condition for further work such as cold drawing or machine work. Where a brighter finish is desired on the stock the bars may be subjected to a dip pickling after the de-scaling operation. Where it is desired to produce a "close tolerance" bar whose cross sectional dimensions are maintained within the desired narrow range the bar may be stretched just sufficiently to reduce its cross sectional area provided, of course, that such reduction will also effect the removal of the scale. In the production of close tolerance bars this can be taken into consideration and the rolls designed so that the hot rolled or annealed bar will be enough oversize to permit an elongation sufficient to effectively remove the scale and at the same time give the desired reduction in cross sectional area.

Figure 5:
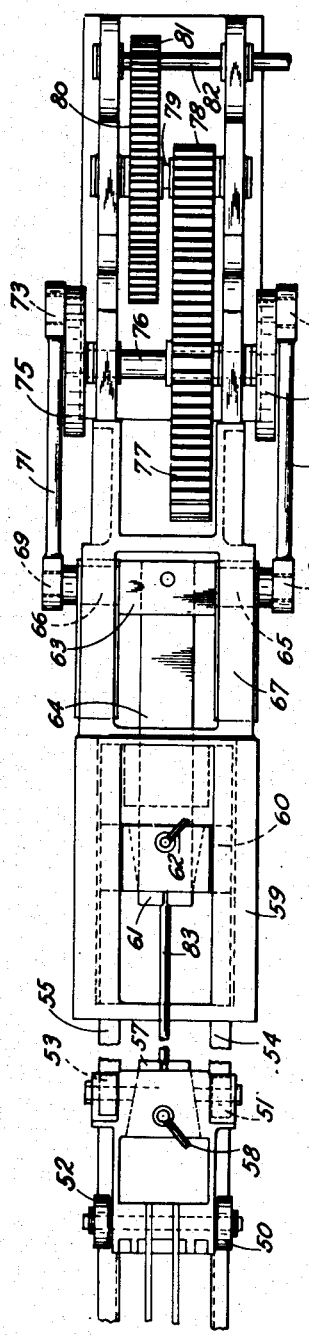
Figure 5 is a plan view of the mechanism illustrated in Figure 4.
Figure 4:
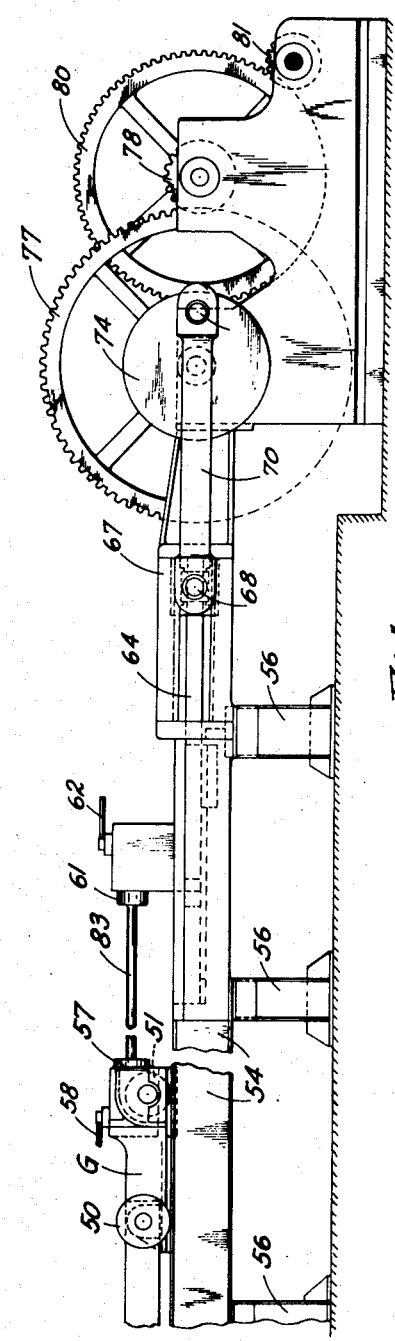
Figure 4 is a side elevation of a modified form of apparatus for stretching bars or rods in which the degree of stretch is not adjustable.

In Figures 4 and 5 I have illustrated a modified form of apparatus particularly adapted to stretch and de-scale a particular size of rod or bar. After it has been determined just how far a given length of a particular size hot rolled or annealed rod or bar must be stretched to properly remove the scale and reduce the cross sectional area to the desired value, a machine of the type illustrated in Figure 4 can be advantageously used. In this machine the stationary stock gripping end may be quite similar to that described in Figures 1 and 2 and comprises a carriage G which is supported on wheels 50, 51, 52 and 53. The track members 54 and 55 correspond to members 1 and 2 of Figures 1 and 2 and form a support for the carriage G. The pedestals 56 support the track members 54 and 55 the desired height above the floor. A stock gripping chuck 57, of any desired type, may be operated by the lever 58 and is mounted on the carriage G.

The moving end of the bar stretching apparatus of Figures 4 and 5 comprises a guide member 59 supported by the pedestal 56 and adapted to form a guideway for the sliding member 60 which carries the stock gripping chuck 61. An operating lever 62 is provided for manual operation of the chuck 61. The sliding member 60 is adapted to slide in the guideways of the member 59 and is connected to the cross head 63 by a link 64. The cross head 63 has bearing block portions 65 and 66 which are adapted to slide in suitable horizontal guideways in the frame 67. Trunnions 68 and 69 are formed on the outer ends of the bearing block members 65 and 66. These trunnions support the ends of the connecting rods 70 and 71 which, at their opposite ends, have a bearing on the crank pins 72 and 73 respectively. The crank pins 72 and 73 are carried on the disc members 74 and 75 which are secured to the outer ends of the shaft 76 to which is also secured the gear 77. Gear 78 engages gear 77 and is supported on shaft 79 which also supports gear 80 which engages gear 81 on shaft 82. The driving motor (not shown) may be attached to the broken off end (Figure 4) of shaft 82.

When the driving motor is operated the crank pins 72 and 73 will be moved through the gear train above described and the rotary movement of the crank pins will be transformed by the connecting rods 70 and 71 into a reciprocatory movement of the cross head 63, the sliding member 60 and the stock gripping chuck 61. When the parts are in the position shown in Figures 4 and 5 the chuck 61 is in its extreme right position and it may be assumed that the bar 83 has just been stretched. The driving motor will be stopped at this point and the bar removed. The motor will again be started and run until the crank pins 72 and 73 have moved through 180°. At this point the motor will be stopped and a new bar, of the proper length, will be inserted in the gripping chucks 57 and 61. The motor will again be started and when the crank pins 72 and 73 have moved through 180° the bar will have been stretched the desired amount and the cycle may be repeated with another bar. With this form of my apparatus the degree of stretching is determined by the throw of the cranks which operate the reciprocating chuck carrying member 60. Where large quantities of one size bar are to be de-scaled and sized, this type of apparatus may have certain advantages in simplicity and ease of operation over the type shown in Figures 1 and 2 which may be modified to accommodate a large range of sizes and types of articles which it is desired to de-scale.

In Figures 6 and 7 I have illustrated, paritally diagrammatically, apparatus adapted to carry out my improved method of continuously removing the scale from coils of hot rolled and/or annealed rod or the like and drawing the de-scaled rod through a die whereby the cross sectional area is reduced and the resulting product given the desired bright finish.

Essentially this apparatus consists of the usual type of wire drawing drum 90 which is driven by any suitable means (not shown) and on which the wire is wound after passing through the die 91. By winding the wire on the drum the rod is pulled through the die 91. In customary wire drawing practice the wire or rod is drawn through the die from a coil which is supported on a suitable freely rotatable reel. In my improved method of drawing rod having a scale on its outer surface I interpose, between the die and the reel, means for holding back the rod or exerting a force tending to oppose the pulling of the rod through the die by the rotating drum.

As illustrated in Figures 6 and 7 "hold-back" apparatus consists of a frame or base 92 on which are supported bearing blocks 93 and 94. These bearing blocks are preferably bolted to the frame by bolts 95 and carry the transversely extending horizontal shafts 96 and 97. A small roller 98 is mounted on the shaft 96 and a larger roller 99 is mounted on the shaft 97. Each of these rollers is provided with a grooved face to guide the rod in a manner which will later appear. One end of the shaft 97 extends out beyond the frame 92 and carries a brake drum 100. A brake shoe 101 is adapted to engage the brake drum 100 and offer resistance to movement of the shaft 97 and the roller 99. As illustrated the brake is adjustable to give the desired resistance. It will be understood that any suitable means may be provided for offering resistance to rotation of the roller 99 and the illustrated braking arrangement is intended to be merely a diagrammatic showing of one way for offering a variable resistance to rotation of roller 99.

The vertical T-section column members 102 and 103 are secured to the frame 92 in any suitable manner, as by welding, and the upper ends of the columns 102 are spaced from the columns 103 by the transversely extending bars 104 which may be welded to the upper ends of the columns 102 and 103. Spacing blocks 104' are mounted on the inner sides of the columns 102. These blocks support members 105 to which are secured the upper and lower bearing blocks 106 and 107. The vertical shafts 108 and 109 are rotatably supported in suitable bearings in the bearing blocks 106 and 107. The large roller 110 is mounted on the shaft 109 and the small roller 111 is mounted on the shaft 108. In the illustrated form of my apparatus both of these rollers 110 and 111 are free to rotate but it will be understood that, if desired, a suitable brake may be applied to one or both of the shafts which carry these rollers to augment the resistance offered by the brake 100—101.

Between the roller 111 and the die 91 I have illustrated diagrammatically a wiping device 112. This device may consist of brushes or other suitable means for wiping off the scale which is freed from the rod before the rod passes through the die 91.

By referring to Figures 6 and 7 it will be seen that the rod, moving in the direction of the arrows at the right hand side of these figures, comes from a coil (not shown) mounted on a reel (not shown) and passes under the roller 98. The rod is then wound several times around the roller 99 which has a horizontal axis. From the roller 99 the rod passes to and is wound several times around the roller 110 which has a vertical axis. As is seen in Figure 7 the roller 110 is supported by the bearing block 107 so that its center lies approximately in line with the top of the roller 99. From the roller 110 the rod passes around the roller 111 and thence to and through the wiper 112 and the die 91. From the die 91 the drawn rod is wound upon the driven drum 90.

In the operation of the above described apparatus the hot rolled or annealed rod or the like, which has a more or less heavy scale, is wound around the rollers 99 and 110 as is seen in Figures 6 and 7. As these rollers are disposed at substantially 90° the rod is bent in two directions. Some of the scale on the rod will be freed during this bending action as the bending and the engagement of the rod with the rollers will break some of the scale.

The primary purpose of the "hold-back" apparatus, however, is to exert a resistance to the pull of the drum 90 so that the rod will be stretched between the point where it leaves the roller 111 and the point where it enters the die 91, sufficiently to free the rod from scale as has been described above in connection with the apparatus of Figures 1 to 5 inclusive. The die 91 will be spaced from the roller 111 a distance sufficient to permit the desired degree of stretch to occur. The wiper 112 is preferably disposed just ahead of the die 91 so that it can brush off any loose scale which does not drop off of the rod during stretching operation.

After the rod passes through the die 91 the tensile strength and hardness thereof are increased due to the cold working which occurs in passing through the die. Therefore, the portion of the drawn rod or wire between the drum 90 and the die 91 will offer greater resistance to stretching than the portion of the rod between the die 91 and the roller 111. It will thus be seen that the rod will stretch before it passes through the die but will not stretch to an undesirable extent after it passes through the die. By adjusting the brake 100—101 the degree of resistance imposed by the "hold-back" device can be controlled. The greater this resistance the greater will be the amount of stretch which will occur between the roller 111 and the die 91 and by varying the action of the brake the stretch can be regulated to completely remove the scale from any type of rod being handled.

With my improved apparatus above described and illustrated in Figures 6 and 7 hot rolled or annealed steel having closely adhering scale may be continuously de-scaled and drawn without pickling or other expensive scale removing operations. The die cooperates with the "hold-back" device and with the drum which exerts the pulling force because the die cold works the rod and increases its resistance to streach whereby the stretch in the rod will occur at the place where it is desired; namely, between the die and the "hold-back" device.

Thus it will be seen that all the elements of the apparatus combine to achieve the desired result; namely, the continuous de-scaling and drawing of rod or the like.

Although I have described the illustrated embodiments of my invention in considerable detail it will be understood that variations and modifications may be made without departing from the spirit of my invention. My improved process can be carried out in apparatus other than that illustrated and I do not, therefore, limit myself to the specific forms herein described but claim as my invention all embodiments thereof coming within the scope of the appended claims.

I claim:

1. A continuous process of de-scaling and drawing metallic rod and the like having a closely adhering scale which includes the steps of pulling the rod continuously through a die while applying a resisting force to the rod in front of the die, said force being applied at a point sufficiently far ahead of the die and being sufficiently great to stretch the rod between the die and point of applying the resisting force whereby the scale will be broken and freed from the rod.

2. A continuous process of de-scaling and drawing metallic rod and the like having a closely adhering scale which includes the steps of pulling the rod continuously through a die while applying a resisting force to the rod in front of the die, said force being applied at a point sufficiently far ahead of the die and being sufficiently great to stretch the rod between the die and point of applying the resisting force whereby the scale will be broken and freed from the rod, and conitinuously brushing off said freed scale from said rod before the rod enters the die.

3. A continuous process of de-scaling and drawing metallic rod and the like having a closely adhering hot roll or anneal scale, which includes the steps of pulling the rod continuously through a die while applying a resisting force to the rod ahead of the die, said resistance being sufficiently great to stretch the rod between 2% and 6% between the point of its application and the die whereby the scale will be broken and freed from the rod.

4. In combination in apparatus for continuously de-scaling and drawing metal rods and the like, a driven rotatable drum, a stationary die, said drum being adapted to draw said rod through said die, and means, spaced from the entering side of the die, for opposing the action of said drum, whereby said rod will be stretched before it enters said die and the scale freed therefrom.

5. In combination in apparatus of the type described, a stationary die, means for drawing a metallic rod or the like through said die and means disposed ahead of said stationary die for opposing the action of said drawing means whereby the rod or the like will be stretched beyond the elastic limit of the scale thereon before it enters said die.

6. In combination in apparatus for continuously de-scaling and drawing metal rods and the like, a die, means for drawing the rod through said die, and means for holding back on the rod against the pull of said drawing means, said holding back means being disposed on the side of the die which the rod enters and including a pair of rollers around which the rod may be wrapped and having their axes disposed substantially at right angles to each other and brake means for retarding rotation of at least one of said rollers.

7. In combination in apparatus for continuously de-scaling and drawing metal rods and the like, a stationary die, means for drawing the rod through the die, a roller spaced from and ahead of said die and having a face about which the rod may be wound, means for rotatably supporting said roller, and brake means for retarding rotation of said roller caused by the movement of the rod and means for regulating the reaction of said brake means whereby the rod or the like may be stretched ahead of the die sufficiently to free the scale therefrom.

8. A continuous process of de-scaling and drawing metal rod and the like which includes the steps of continuously exerting a pulling force on the rod in one direction and simultaneously exerting a back pull or resistance on said rod in the opposite direction, drawing said rod through a die disposed between the points of application of said pulling force and said back pull or resistance, said back pull being exerted on said rod before it enters the die and being of a value to stretch said rod before it enters the die sufficiently to free the scale therefrom, and said pulling force being equal to said back pull plus the force required to draw the rod through the die, said rod being cold worked in passing through said die whereby its elastic limit is increased to a value greater than said pulling force.

9. A process of de-scaling and drawing metal rod or the like having scale adhering thereto which includes the steps of exerting a tensile force on the rod and drawing the rod through a die while exerting a back pull or resisting force on the rod ahead of the die, said back pull being sufficient to stretch the portion of the rod ahead of the die beyond the elastic limit thereof and said tensile force being insufficient to stretch the portion of the rod which has passed through the die beyond its elastic limit.

10. A process of de-scaling and finishing scale bearing metal rod or the like which includes the steps of pulling the rod through a die while exerting a resisting force on said rod ahead of the die, the pulling force and the resisting force being so proportioned that the portion of the rod ahead of the die will be stretched beyond its elastic limit and the scale freed therefrom while the portion of the rod which has passed through the die will be stressed only to a point below its elastic limit.

11. In a wire drawing machine, a reducing die, means for pulling wire through the die, a rotatable retarding drum rearwardly of the die about which the wire is coiled, means acting on the wire rearwardly of the retarding drum to apply tension to the wire passing to the drum, and means for exerting a retarding force on the retarding drum which opposes forward rotation of the drum to apply additional tension to the wire passing through the die.

12. In a wire drawing machine, a reducing die, means for pulling wire through the die, a rotatable retarding drum rearwardly of the die about which the wire is coiled, means acting on the wire rearwardly of the retarding drum to apply tension to the wire passing to the drum, means for exerting a retarding force on the retarding drum which opposes forward rotation of the drum to apply additional tension to the wire passing through the die, and means for varying the retarding force exerted on the retarding drum.

JOHN S. LYNCH.